United States Patent Office 3,303,175
Patented Feb. 7, 1967

3,303,175
PROCESS FOR THE COPOLYMERIZATION OF ALPHA-OLEFINS IN THE PRESENCE OF A COORDINATION CATALYST AND AN ORGANIC SULFUR COMPOUND
Marco Antonio Achon, Chester, Pa., assignor to Avisun Corporation, Philadelphia, Pa., a corporation of Delaware
No Drawing. Filed Jan. 21, 1963, Ser. No. 252,566
20 Claims. (Cl. 260—88.2)

This invention relates to the copolymerization of ethylene with other polymerizable unsaturated hydrocarbons, and more particularly to novel catalyst systems for effecting such copolymerization.

The copolymerization of ethylene and propylene in the presence of a coordination complex catalyst such as the reaction product of vanadium tetrachloride or vanadium oxytrichloride and an aluminum alkyl such as aluminum triisobutyl or aluminum diethyl chloride in an inert solvent to yield a product resembling unvulcanized rubber is known to the art, and is described in Belgian Patent 553,655. Such copolymers may be crosslinked by peroxides or other free-radical generators to form a synthetic elastomer which is highly stable to degradation by ozone, due to the almost complete absence of unsaturation in the molecule. It is also known to copolymerize ethylene and propylene or other alpha olefin with a diolefin in order to introduce unsaturation into the molecule to permit vulcanization by curing systems commonly used in the rubber industry. An example of such terpolymers is shown in U.S. Patent 3,000,866. In such processes, after completion of the reaction, the reaction mixture is treated with an alcohol or other polar material to destroy the activity of the catalyst and to convert the catalyst residues to water-soluble compounds. The solution of copolymer in the solvent is then washed with water and steam-stripped to remove the solvent and to recover the copolymer as a suspension of crumbs in water.

Using the catalytic systems known to the prior art, the greater part of the ethylene and propylene is converted to a non-crystalline random copolymer which is soluble in the solvent and which is the desired product. However, a small part of the ethylene and/or propylene is converted either to a crystalline homopolymer of one of the monomers, or to a copolymer in which the molecule contains long blocks of ethylene or propylene homopolymer which appear to be crystalline by X-ray analysis. If such copolymers or homopolymers are allowed to remain in the recovered random copolymer, the raw and compounded Mooney viscosity is undesirably high, causing difficulties in processing, and the physical properties of the cured copolymer are adversely affected by the presence of the crystalline polymer.

The crystalline polymer is insoluble in the solvent and appears therein as a swollen gel. It is extremely difficult to separate the gel by filtration, but it can be removed by other methods, such as that shown in U.S. patent application Serial No. 103,710 now U.S. Patent No. 3,071,566. Removal by such a method adds another processing step, which increases the cost of the process.

It is an object of this invention to provide a catalyst system for the copolymerization of olefins which will cause the polymerization to proceed in a manner such that only traces, if any, of crystalline polymer are formed.

It is a further object of this invention to provide a catalyst system which will cause polymerization to proceed at a faster rate than when using conventional catalyst systems, such as a combination of vanadium oxytrichloride and aluminum diethyl chloride.

In accordance with the present invention, it has been discovered that a three component catalyst system consisting of the product obtained by mixing, in an inert solvent, a vanadium oxytrihalide, an aluminum alkyl dihalide, and a sulfur containing aromatic compound, such as a sulfone, sulfide, disulfide, sulfoxide, or sulfonamide, will accomplish the foregoing objects.

The aluminum component of the novel catalyst system may be any aluminum alkyl dihalide, such as aluminum ethyl dichloride, aluminum isobutyl dichloride, aluminum ethyl dibromide, and the like. The vanadium component of the catalyst system may be vanadium oxytrichloride, or vanadium oxytribromide. The mol ratio of aluminum compound to vanadium compound should be from about 1:1 to 10:1, preferably from about 2:1 to about 5:1. Examples of sulfur-containing aromatic compounds useful as catalyst components are phenyl sulfone, benzyl sulfone, phenyl sulfide, phenyl disulfide, benzyl disulfide, tolyl sulfone, tolyl sulfide, phenyl sulfoxide, tolyl sulfoxide, and N,N-dimethyl p-toluene sulfonamide. The mol ratio of aluminum compound to aromatic compound must be from about 12:1 to about 2:1, preferably about 3:1, since at higher or lower ratios elastomeric polymer is not formed.

Copolymerization reaction conditions include temperatures from 0° C. to 150° C., and pressures of from 0 to 150 p.s.i.g. When operating at lower pressures, say from 0 to 10 p.s.i.g., it is preferred to recirculate the feed continuously through the reactor, but when operating at higher pressures, it is preferred to introduce the feed continuously to the reactor at a rate such as to maintain the desired pressure therein. As solvents for the reaction, saturated hydrocarbons such as hexane, heptane or octane may be used. Aromatic hydrocarbons such as benzene, toluene, or xylene are also suitable, as are halogenated hydrocarbons such as perchloroethylene. Benzene is preferred, however, since reaction rates are somewhat higher in benzene than in aliphatic solvents, and it is less costly and easier to recover than the chlorinated hydrocarbon solvents.

The gaseous feed to the copolymerization reactor should consist of from 20% to 80% ethylene and from 80% to 20% propylene or butene-1 depending on the amount of ethylene which it is desired to incorporate into the copolymer. When it is desired to incorporate unsaturation into the molecule, it is desirable to add to the reactor sufficient diolefin, for example cyclopentadiene, to incorporate about 0.5% to 5% unsaturation into the polymer. The diolefin can be added in its entirety at the start of the reaction, but it is preferably added in increments during the reaction, in order to incorporate it more randomly into the polymer.

At the end of the desired reaction time, when operating batchwise, the reactor is depressured, the catalyst activity is killed by the addition of an alcohol, and the product is recovered. Usually the reaction is stopped when the reaction mixture contains about 5% to 15% by weight of product, since if the reaction goes much further, the solution becomes too viscous for easy handling.

In order that those skilled in the art may more fully understand the nature of my invention and the method for carrying it out, the following examples are given:

CONTROL 1

A polymeriztaion bottle is charged with 100 ml. of benzene, and 0.861 millimole of ethyl aluminum dichloride is added. The bottle is then pressured to 45 p.s.i.g. with a mixture of 30 mol percent ethylene and 10 mol percent propylene. 0.287 millimole of VOCl$_3$ is then added, and the polymerization bottle, which is fitted with a magnetic stirrer, is put in an oil bath at 40° C. Polymerization starts immediately, and is continued for 30 minutes while maintaining the pressure by continuous addition of the ethylene-propylene mixture. The reaction is then killed by the addition of methanol, which destroys the catalyst and precipitates the benzene-soluble polymer. A total of 1.39 grams of benzene-soluble copolymer is recovered. This polymer contains about 90% ethylene, as determined by infra-red, and is non-elastomeric in character.

*Example 1*

The procedure of Control 1 is followed, except that 0.072 millimole of phenyl sulfone is added prior to pressuring the bottle with the ethylene-propylene mixture. 1.68 grams of an elastomeric copolymer are recovered.

*Example 2*

The procedure of Example 1 is followed, except that the amount of phenyl sulfone is increased to 0.287 millimole. 2.96 grams of elastomeric product having an ethylene content of 62.8% are recovered.

*Example 3*

CONTROL 2

The procedure of Example 1 is followed, except that the amount of phenyl sulfone is increased to .41 millimole, 2.20 grams of elastomeric copolymer are recovered, having an ethylene content of 74.4%.

The procedure of Example 1 is followed, except that the amount of phenyl sulfone is increased to 0.574 millimole. Only 0.25 gram of benzene-soluble, elastomeric copolymer is recovered, along with 0.65 gram of benzene insoluble, non-elastomeric product.

*Example 4*

The procedure of Control 1 is followed, except that 0.144 millimole of phenyl sulfide is added to the bottle prior to pressuring with the ethylene-propylene mixture, 3.17 grams of elastomeric copolymer having a reduced specific viscosity of 1.74 are recovered.

*Example 5*

Example 4 is repeated, increasing the amount of phenyl sulfide to 0.287 millimole. 3.66 grams of elastomeric copolymer having a reduced specific viscosity of 1.94 and an ethylene content of 63.1% are recovered.

*Example 6*

Example 4 is repeated, except that the amount of phenyl sulfide is increased to 0.41 millimole. 3.54 grams of elastomeric copolymer having a reduced specific viscosity of 1.77 and an ethylene content of 59.7% are recovered.

*Example 7*

The procedure of Control 1 is followed, except that 0.144 millimole of benzyl sulfide is added to the bottle prior to pressuring with the ethylene-propylene mixture. 2.87 grams of elastomeric product are recovered, having a reduced specific viscosity of 1.08.

*Example 8*

The procedure of Example 7 is followed, except that the amount of benzyl sulfide is increased to .287 millimole. 2.76 grams of elastomeric copolymer are recovered, containing 66.3% ethylene, and having a reduced specific viscosity of 3.99.

*Example 9*

The procedure of Example 7 is followed, except that the amount of benzyl sulfide is increased to 0.41 millimole. 2.10 grams of elastomeric product are recovered, having an ethylene content of 71.2% and a reduced specific viscosity of 5.05.

*Example 10*

The procedure of Control 1 is followed, except that 0.144 millimole of phenyl disulfide is added to the bottle prior to pressuring with the ethylene-propylene mix. 1.52 grams of elastomeric copolymer are recovered, containing 72.7% ethylene and having a reduced specific viscosity of 2.27.

*Example 11*

Example 10 is repeated, except that the amount of phenyl disulfide is increased to 0.287 millimole. 1.08 grams of elastomeric product are recovered.

*Example 12*

The procedure of Control 1 is followed, except that 0.144 millimole of phenyl sulfoxide is added to the bottle prior to pressuring with the ethylene-propylene mixture. 1.75 grams of somewhat rubbery copolymer are recovered.

*Example 13*

Example 12 is repeated, except that the phenyl sulfoxide is increased to 0.287 millimole. A yield of 3.31 grams of elastomeric product is obtained, having an ethylene content of 61.7% and a reduced specific viscosity of 3.16.

*Example 14*

Example 12 is repeated, except that the phenyl sulfoxide is increased to 0.41 millimole. The yield of elastomeric copolymer is 2.89 grams, containing 64.4% ethylene and having a reduced specific viscosity of 3.50.

*Example 15*

The procedure of Control 1 is followed, except that 0.144 millimole of N,N-dimethyl p-toluenesulfonamide is added to the bottle prior to pressuring with the ethylene-propylene mixture. The yield of elastomeric copolymer is 3.93 grams. It has an ethylene content over 90%, and a reduced specific viscosity of 2.38.

*Example 16*

Example 15 is repeated, increasing the N,N-dimethyl p-toluenesulfonamide to 0.287 millimole. The yield of elastomeric copolymer is 3.36 grams. It contains 60.3% ethylene and has a reduced specific viscosity of 2.77.

*Example 17*

Example 15 is repeated, increasing the N,N-dimethyl p-toluenesulfonamide to 0.41 millimole. 3.67 grams of elastomeric product are recovered. It contains 63.7% ethylene and has a reduced specific viscosity of 3.07.

The foregoing examples illustrate the formation of ethylene-propylene copolymers which are essentially free of unsaturation, and which may be crosslinked with a peroxide cure to form synthetic rubbers which are extremely resistant to ozone. However, these copolymers cannot be vulcanized by the recipes commonly used to vulcanize unsaturated polymers such as natural rubber, SBR, or butyl rubber. I have found that my new catalyst systems are also adapted to catalyze the terpolymerization of ethylene, propylene, and a diolefin to yield polymers containing unsaturation, which may be crosslinked by conventional rubber cures. Conjugated diolefins, such as butadiene or isoprene may be used as the third monomer, but non-conjugated diolefins are preferred, such as dicyclopentadiene, 1,5 hexadiene, or other straight chain dienes having terminal unsaturation, since these dienes appear to enter the polymer in a more random fashion than the conjugated dienes, and the properties of the cured polymer are better.

*Example 18*

This example shows the use of my novel catalyst system in the production of a sulfur vulcanizable terpolymer of ethylene, propylene, and dicyclopentadiene. The procedure followed is as follows: Five polymerization bottles are charged with 100 ml. benzene, 0.861 millimole of ethyl aluminum dichloride, 0.359 millimole of phenyl sulfone, and 0.13 ml. of dicyclopentadiene. The bottles are then pressured with a mixture of 30% ethylene and 70% propylene to 45 p.s.i.g. 0.287 millimole of VOCl₃ are added, and the bottles are placed in the oil bath at 40° C. After seven minutes and again after 15 minutes an additional 0.13 ml. of cyclopentadiene is added. After 30 minutes the reaction is stopped, and the reaction product worked up to recover a total of 13.76 grams of terpolymer. One hundred parts of the terpolymer were then compounded with 50 parts of HAF carbon black, 1.5 parts of sulfur, 5 parts of ZnO, 1.5 parts of Thionex, and 0.5 part of MBT. The compounded polymer was then cured at 320° F. for 30 minutes. The vulcanized material had the following physical properties:

| | |
|---|---:|
| Tensile strength, p.s.i. | 2425 |
| 100% modulus, p.s.i. | 525 |
| 200% modulus, p.s.i. | 1400 |
| 300% modulus, p.s.i. | 2400 |
| Percent elongation | 300 |
| Shore A hardness | 70 |
| Permanent set, percent | 13 |

The invention claimed is:

1. A process for the copolymerization of olefins which comprises contacting a mixture of ethylene and at least one other hydrocarbon containing olefinic unsaturation selected from the group consisting of propylene, butene-1, and unconjugated diolefins, in an inert solvent, with a catalyst consisting essentially of the product obtained by mixing an aluminum alkyl dihalide, a vanadium compound selected from the group consisting of vanadium oxytrichloride and vanadium oxytribromide, and an organic sulfur compound containing at least one phenyl radical selected from the group consisting of sulfones, sulfides, disulfides, sulfoxides, and sulfonamides, wherein the mol ratio of the aluminum compound to the vanadium compound is from 1:1 to 10:1, and the mol ratio of the aluminum compounds to the sulfur compound is from 12:1 to 2:1.

2. The process according to claim 1 in which the sulfur compound is N,N-dimethyl p-toluenesulfonamide.

3. The process according to claim 1 in which the sulfur compound is phenyl sulfoxide.

4. The process according to claim 1 in which the sulfur compound is benzyl sulfide.

5. The process according to claim 1 in which the sulfur compound is phenyl sulfide.

6. The process according to claim 1 in which the sulfur compound is phenyl sulfone.

7. A process for the copolymerization of ethylene and propylene which comprises contacting, in an inert solvent, at a temperature of from 0° C. to 150° C., a mixture of ethylene and propylene containing from 20% to 80% ethylene with a catalyst consisting essentially of the product obtained by mixing an aluminum alkyl dihalide, a vanadium compound selected from the group consisting of vanadium oxytrichlorode and vanadium oxytribromide, and an organic sulfur compound containing at least one phenyl radical selected from the group consisting of sulfones, sulfides, disulfides, sulfoxides, and sulfonamides, wherein the mol ratio of the aluminum compound to the vanadium compound is from 1:1 to 10:1, and the mol ratio of aluminum compound to sulfur compound is from 12:1 to 2:1, and recovering an essentially amorphous ethylene-propylene copolymer.

8. The process according to claim 7 in which the aluminum alkyl dihalide is an aluminum alkyl dichloride and the sulfur compound is N,N-dimethyl p-toluenesulfonamide.

9. The process according to claim 7 in which the aluminum alkyl dihalide is an aluminum alkyl dichloride and the sulfur compound is phenyl sulfoxide.

10. The process according to claim 7 in which the aluminum alkyl dihalide is an aluminum alkyl dichloride and the sulfur compound is benzyl sulfide.

11. The process according to claim 7 in which the aluminum alkyl dihalide is an aluminum alkyl dichloride and the sulfur compound in phenyl sulfide.

12. The process according to claim 7 in which the aluminum alkyl dihalide is an aluminum dichloride and the sulfur compound is phenyl sulfone.

13. A composition having catalytic activity in the copolymerization of olefins which consists essentially of the product obtained by mixing, in an inert solvent, an aluminum alkyl dihalide, a vanadium compound selected from the group consisting of vanadium oxytrichloride and vanadium oxytribromide, and an organic sulfur compound containing at least one phenyl group selected from the group consisting of sulfones, sulfides, disulfides, sulfoxides, and sulfonamides, wherein the mol ratio of the aluminum alkyl dihalide to the vanadium compound is from 1:1 to 10:1, and the mol ratio of the aluminum alkyl dihalide is from 12:1 to 2:1.

14. The composition according to claim 13 in which the aluminum alkyl dihalide is an aluminum alkyl dichloride and the sulfur compound is N,N-dimethyl p-toluenesulfonamide.

15. The composition according to claim 13 in which the aluminum alkyl dihalide is an aluminum alkyl dichloride and the sulfur compound is phenyl sulfoxide.

16. The composition according to claim 13 in which the aluminum alkyl dihalide is an aluminum alkyl dichloride and the sulfur compound is benzyl sulfide.

17. The composition according to claim 13 in which the aluminum alkyl dihalide is an aluminum alkyl dichloride and the sulfur compound is phenyl sulfide.

18. The composition according to claim 13 in which the aluminum alkyl dihalide is an aluminum alkyl dichloride and the sulfur compound is phenyl sulfone.

19. A composition having catalytic activity in the copolymerization of olefins which consists essentially of the product obtained by mixing, in an inert solvent, aluminum ethyl dichloride, vanadium oxytrichloride, and N,N-dimethyl p-toluenesulfonamide, in a mol ratio of aluminum ethyl dichloride to vanadium oxytrichloride of from 1:1 to 10:1, and to N,N-dimethyl p-toluenesulfonamide of from 12:1 to 2:1.

20. A composition having catalytic activity in the copolymerization of olefins which consists essentially of the product obtained by mixing, in an inert solvent, aluminum ethyl dichloride, vanadium oxytrichloride, and phenyl sulfoxide, in a mol ratio of aluminum ethyl dichloride to vanadium oxytrichloride of from 1:1 to 10:1, and to phenyl sulfoxide of from 12:1 to 2:1.

References Cited by the Examiner

UNITED STATES PATENTS

| | | | |
|---|---|---|---|
| 2,843,577 | 7/1958 | Friedlander et al. | 260—94.9 |
| 3,026,311 | 3/1962 | Coover et al. | 260—93.7 |

FOREIGN PATENTS 608,467  3/1962  Belgium.

JOSEPH L. SCHOFER, *Primary Examiner.*

M. B. KURTZMAN, *Assistant Examiner.*